United States Patent [19]

Philipp et al.

[11] Patent Number: 5,395,654
[45] Date of Patent: Mar. 7, 1995

[54] GUANIDINE BASED VEHICLE/BINDERS FOR USE WITH OXIDES, METALS AND CERAMICS

[75] Inventors: Warren H. Philipp, Olmsted Township, Cuyahoga County; Lisa C. Weitch, Westlake; Martha H. Jaskowiak, Grafton, all of Ohio

[73] Assignee: The United States of America as represented by the Administrator of the National Aeronautics and Space Administration, Washington, D.C.

[21] Appl. No.: 81,180

[22] Filed: Jun. 25, 1993

Related U.S. Application Data

[63] Continuation of Ser. No. 842,313, Mar. 13, 1992, Pat. No. 5,256,451.

[51] Int. Cl.$^6$ .............................................. B05D 3/02
[52] U.S. Cl. ............................. 427/376.6; 427/383.5; 427/384; 427/378.1; 427/434.6
[58] Field of Search ............... 427/376.6, 383.5, 384, 427/434.6, 398.1

[56] References Cited

U.S. PATENT DOCUMENTS

| | | | |
|---|---|---|---|
| 4,562,050 | 12/1985 | Koeda et al. | 501/96 |
| 4,707,298 | 11/1987 | Tymon | 252/378 R |
| 4,919,860 | 4/1990 | Schindler et al. | 427/227 |
| 5,006,625 | 11/1991 | Philipp | 501/127 |

Primary Examiner—Benjamin L. Utech
Attorney, Agent, or Firm—James A. Macklin; Gene E. Shook; Guy M. Miller

[57] ABSTRACT

The use of guanidine salts of organic fatty acids (guanidine soaps) as vehicles and binders for coating substrate surfaces is disclosed. Being completely organic, the guanidine soaps can be burned off leaving no undesirable residue. Of special interest is the use of guanidine 2-ethyl hexanoate as the vehicle and binder for coating problematic surfaces such as in coating alumina fibers with platinum or zirconia. For this application the guanidine soap is used as a melt. For other applications the guanidine soap may be used in a solution with a variety of solvents, the solution containing chlorometalates or powdered metals, refractories or ceramics.

5 Claims, 1 Drawing Sheet

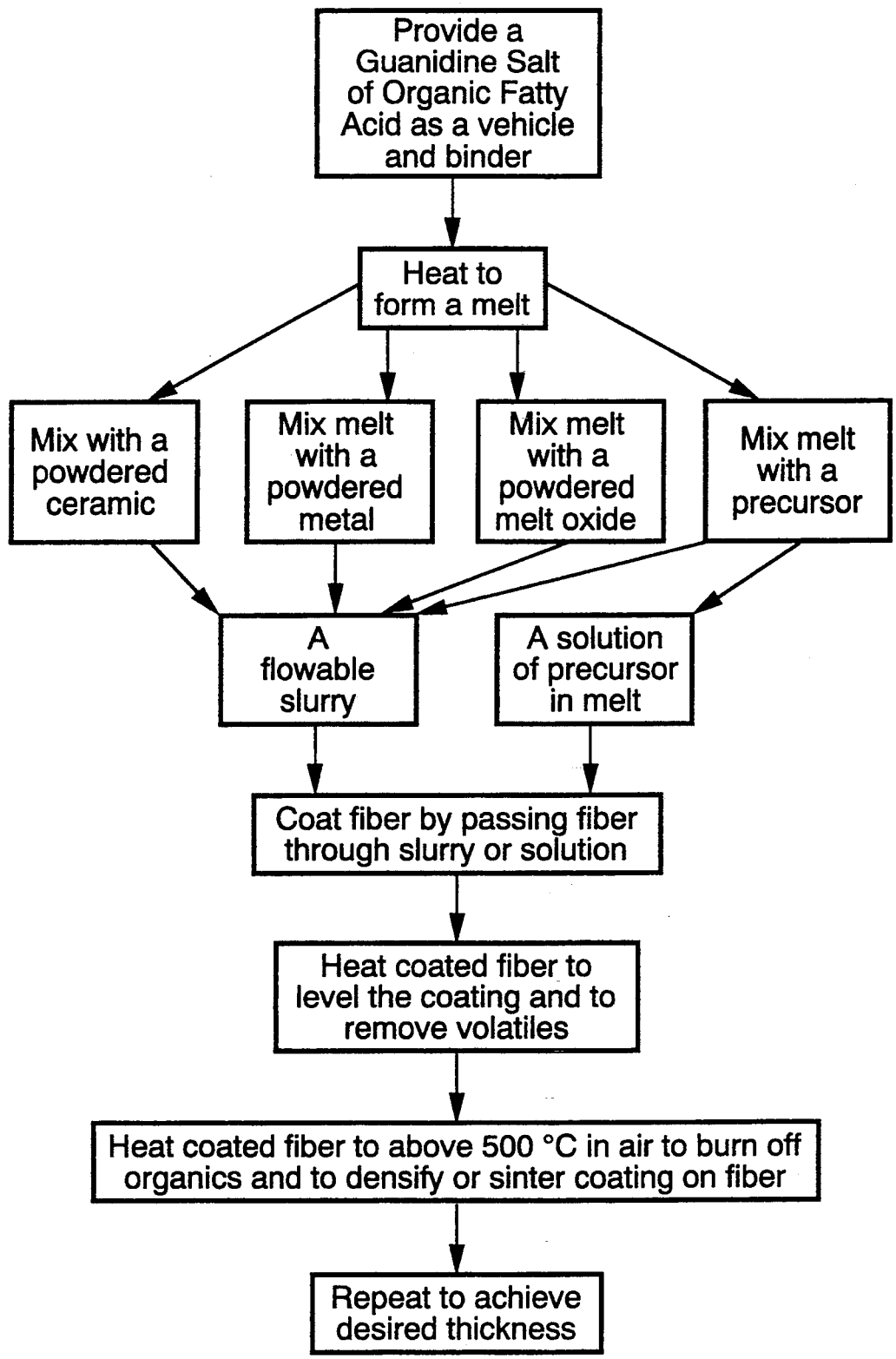

GUANIDINE BASED VEHICLE/BINDERS FOR USE WITH OXIDES, METALS AND CERAMICS

ORIGIN OF THE INVENTION

The invention described herein was made by employees of the United States Government and may be manufactured or used by or for the United States Government without the payment of any royalties thereon or therefor.

This is a continuation of application Ser. No. 07/842,313, filed Mar. 13, 1992 and issued on Oct. 26, 1993, as U.S. Pat. No. 5,256,451.

FIELD OF THE INVENTION

The present invention is directed to a method or technique for applying a metal, metal oxide or ceramic coating of controlled thickness to metal, metal oxide or ceramic substrates.

BACKGROUND OF THE INVENTION

The deposition of thin metallic films on substrates by the decomposition of metallo-organic solutions is a technology which has been known for many years. Although the technique has been known for a long time, its primary application has been in the decorative trade, with the main emphasis on producing films of precious metals on ceramic and glass articles. The earliest known application was bright gold for decorating porcelain and this process had been used since 1830.

Almost all of the work prior to 1980 used metallo-organic compounds derived from resins or other natural products and were commonly called metal resinates. These resinates were and still remain suitable for most applications in the decorative trade, but the variability of chemistry, which is an inescapable result of the preparation from natural products, was a major impediment to the extensive development of technical applications of the metallo-organic decomposition (MOD) process. It has only been in recent years that MOD films have been produced from pure, well characterized compounds.

Recent applications of MOD processing are in processing technical ceramics where most of the emphasis is on fine particle processing. Sol-gel methods use metal alkoxides as the starting materials and have general formula $M(OR)_n$ where M and R are metals and alkyl groups, respectively. Metal alkoxides are hydrolyzed easily and yield oxides, hydroxides, and hydrated oxides in crystalline and amorphorous forms. The fine powders derived from the metal alkoxides have high surface reactivity, making it possible to use low sintering temperatures and obtain uniform grain size bodies with the desired electrical properties. Others have prepared films from the metal alkoxide solutions by dipping substrates into the solution. The barium titanate films prepared by this method have had very good electrical properties. The metal alkoxide method, however, is a sol-gel method and involves several lengthy steps in processing.

The metallo-organic decomposition technology investigated by R. W. Vest, G. M. Vest and others produce the metal oxide films or powders directly and more quickly than those produced form the sol-gel methods. For example, silver films were fabricated by thermally decomposing the MOD silver inks on silicon for use as collector grids for photovoltaic cells. These collector grids required good adhesion, low contact resistance, low sheet resistance, and long term stability. Also, their deposition methods should not degrade the n-p junction. The fired films were 100% solder leach resistant, had good line definition and excellent long term adhesion. The resistivity was very close to that of bulk silver, indicating the films were very dense. This method of metallizing solar cells was also very inexpensive as compared to sputtering or vapor depositing on Si.

There are many advantages of MOD processing compared to alternate techniques for producing metal and ceramic films. The MOD process yields the equilibrium phases of the desired systems at relatively low temperatures, which circumvents the problem of selective volatility of different species. In general, the low temperature processing yields extremely find grain size polycrystalline films; in many cases the initial inorganic films are amorphous to X-rays. This allows for precise control of grain size by annealing after preparation of the films. The low temperature processing and the achievement of equilibrium phases is primarily due to the fact that the formulation that is deposited on the substrate is a true solution, and hence, the mixing of the various ingredients is on the molecular level. This ultimate mixing and high reactivity also can be used to an advantage in preparing very dense films. In most cases, the films with near theoretical density can be achieved. Starting from solution also leads to films with extremely uniform composition over large areas, and allows for uniform doping in the ppm range. High purity can be maintained during MOD processing by appropriate care in the various processing steps.

There are some intrinsic limitations to MOD processing, however. The volume change in going from the deposited wet film to the fired inorganic films is always large. In addition to requiring care during thermal processing, this large volume change means that the fired films will always be thin. This limitation of film thickness can be overcome by the multilayer approach. A second intrinsic limitation is one of the advantages cited in the previous paragraph, namely, that thermodynamic equilibrium is achieved very rapidly because of the extremely high reactivity upon thermal decomposition. Many of the electronic films in use today have their desirable properties because of the non-equilibrium microstructure. These non-equilibrium microstructures cannot be duplicated by MOD technology but alternate approaches to achieve equivalent electrical properties with an equilibrium microstructure can often be utilized. Another limitation due to the thermodynamic equilibrium achieved is that only oxides or only metals of certain elements can be produced.

OTHER METHODS OF COATING SUBSTRATES

Chemical vapor deposition (CVD) is probably the most common method currently used for producing coatings on substrates. It uses a fairly simple apparatus but requires the use of scrubbers or other methods to clean the exhaust gases. A large number of compositions including carbides, nitrides, and oxides can be deposited with this method. The coatings can be made in thicknesses ranging from nanometers to several micrometers, depending on the length of the furnace and/or the number of CVD cycles to which the fibers are exposed. Compositionally, limits are imposed on the process by the types of gases available and the complex reaction chemistries that occur in the reactor. The uniformity of the coating is determined by the ability of the reactant gases to reach the substrate surface and the temperature at which the reaction is gas-diffusion limited. The process of getting the reactant gases to the substrate surfaces is controlled by reactant-gas partial pressure and reactor geometry. The temperature at which the coating is applied is critical. Temperature controls both the thermodynamics and kinetics of the process. It must be maintained so that the reaction occurs on the substrate, not in the gas phase, and with an appropriate microstructure. Small changes in the temperature may change the reaction and/or kinetics, resulting in an inferior coating. An additional problem with the CVD process is the time required to make deposits. It is a slow process with deposition rates in the 1 to 10 micron/minute range. It is also an expensive process with the amount of equipment and materials needed to coat a substrate.

A number of line of sight techniques are also available for coating substrates and include sputtering, physical vapor deposition, ion implantation, and electron-beam evaporation. The common thread in all of them is that they require a direct path from the source to the substrate. They are all relatively simple techniques to set up and use. It is possible to use multiple targets to expose the entire substrate to the depositing material. The substrates could also be rotated in the chamber during deposition. However, the need for such a rotation or multiple targets could lead to difficulties in uniformity of the coating and its chemical homogeneity. In addition, these techniques are expensive to operate and require numerous hours of maintenance.

TYPE OF PLATINUM SOLUTION DEVELOPED BY R. W. VEST, G. M. VEST AND S. SINGARAM

Two platinum MOD solutions were developed by Vests and Singaram at Purdue University in order to deposit thin Pt films on substrates for electrodes for dielectrics. The first one was a Pt-2 ethylhexanoate produced by the following reactions:

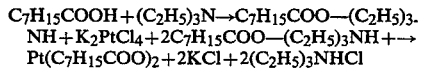

Another platinum MOD solution was platinum amine 2-ethylhexanoate and was produced via the reaction:

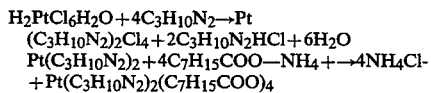

Attempts were made to coat sapphire substrates (1" diameter) as well as wires using these and other MOD solutions. Problems that were noted were poor adhesion, reaction with the substrates and residual salts that reacted with both the substrate and film. Some MOD solutions including the Pt MOD solutions were successful in coating other flat substrates such as silicon wafers and glass slides. Small diameter wires were not easily coated, however, even after the solution's viscosity was modified.

In summary, the metallo-organic methods are particularly useful for coating ceramic fibers with thick coatings of oxides and unreactive metals. With CVD, the process is slow and wasteful of resource material and in order to deposit oxides, volatile precursors (usually metal halides) are required. Some of the noble metals' volatile source materials are difficult to obtain (e.g., Pt, Au). Stoichiometry of mixed oxides using CVD is difficult to control especially for controlled doping of the films. Uniformity can also be also poor with CVD processing. Coatings sputtered on fibers are not uniform when they are laying flat in the chamber. The fibers can be sputtered uniformly, however, after extensive modification of the instrument which can be very expensive. With sol-gel processing, the solutions do not adhere well to the fibers. It is also difficult to obtain mixed sol-gels for mixed oxide coatings as well as some metal coatings (e.g., Ba, Sr). Metal paints, however, adhere well to the fibers but produce very thin coatings, even after many coating applications.

The shortcomings of prior art techniques become evident when one desires to coat curved substrates such as ceramic fibers with thick coatings in the several micron range with metals and oxides. Our new method overcomes these disadvantages in that an ionic soap is used as the vehicle. This allows for the formation of an even, adherent coat to cover the fiber. The ionic soap vehicle system may be conveniently used to coat fibers with noble metals as well as refractory oxides.

SUMMARY OF THE INVENTION

The present invention makes use of a new group of chemicals, namely, guanidine salts of organic fatty acids which are generically soaps for use as vehicles to apply a coating to substrates and also as binders to hold the coating to the substrate prior to sintering or firing. This circumvents the shortcomings of the prior art by enabling the coating of curved substrates such as metal or ceramic fibers. The ionic soap vehicle may also be conveniently used to coat curved substrates with either reactive stable noble metals as well as refractory oxides. More importantly, firing or sintering of the coated substrate causes the guanidine to be driven off leaving a coating containing no deleterious metals such as Na, K or the like.

BRIEF DESCRIPTION OF THE DRAWINGS

A more complete understanding of the present invention can be obtained by reference to the accompanying drawing which is a flow chart that describes the combination of mixing alternatives and the end products as well as the process for coating a fiber.

DETAILED DESCRIPTION OF A PREFERRED EMBODIMENT

The present invention is directed to the coating of metals, ceramics, metal nitrides, metal oxides, metal carbides and carbon with metal or metal oxides using guanidine salts of organic fatty acids as vehicles and binders. The organic fatty acid is an organic carboxylic acid having 7 to 20 carbon atoms which are selected from the group consisting of lauric, mysteric, palmitic, stearic, oleic, linolenic, and 2-ethyl hexanoic acid.

The specific fatty acid salt used in the preferred embodiment is guanidine 2-ethyl-hexanoate. The guanidine 2-ethyl-hexanoate is in solid form at the beginning of the method and is heated to about 150° C. to provide a melt through which a fiber to be coated is drawn.

The melt can be mixed with a powdered structural metal, a metal oxide, a powdered noble metal, or a precursor. When mixed with a powdered structural metal selected from the group consisting of aluminum, copper, iron, steel, zinc, magnesium, cobalt, nickel, metal oxide, the melt mixture becomes a slurry. When mixed with a metal oxide from the group consisting of zirconium, titanium, aluminum, yttrium, magnesium, silicon, boron, cerium, chromium, tin, a slurry is formed. When mixed with a powdered noble metal such as silver, gold, platinum, palladium, rhodium, iridium, ruthenium or osmium, the melt once again forms a slurry.

The final mixture that the present invention is directed to is the mixing of the guanidine melt with a precursor. The precursor can be a guanidine chlorometalate compound in which the metal in the compound is a noble metal selected from the group of gold, platinum, palladium, rhodium, iridium, ruthenium, or osmium.

The guanidine chlorometalate may be insoluble when mixed with the guanidine melt forming a slurry or the guanidine chlorometalate solution may be soluble thus forming a solution when mixed with the guanidine melt or guanidine solution.

The instance in which the guanidine soap is heated forming a melt and a soluble guanidine chlorometalate compound is added forming a solution; is preferred embodiment of the present invention. The solution that forms is thick enough to effectively coat and wet a curved substrate.

When coating a curved substrate such as a fiber selected from the group consisting of oxide fibers, silicate fibers, nitride fibers, or carbon fibers, with noble metals the fiber is drawn through the solutions of the guanidine soap in mixture with the guanidine chlorometalate compound with the guanidine soap serving as a vehicle for wetting and binding the guanidine chlorometalate compound to the fiber.

As discussed above, the guanidine soap vehicle and binder can be conveniently used as a melt. In this case the fibers can be pulled through the melt to provide each fiber with a coating which solidifies on cooling to room temperature. In the present invention ambient air is air at room temperature with room temperature being about 22° C. The fiber is then heated to about 150°–180° C. to cause the coating to flow and form a more uniformly distributed coating on the fiber. Once the heating is performed and the fiber is coated, then the temperature is raised to burn off organic residues and to densify the coating on the fiber. This process is then repeated until the desired thickness of fiber is achieved. An important application of coated fibers is in high temperature composite materials. For example, $Al_2O_3$ structures such as turbine blades for gas turbine engines may comprise a matrix of $Al_2O_3$ incorporating $Al_2O_3$ fibers for strengthening.

To prevent the $Al_2O_3$ fibers from bonding to the oxide matrix of the structure being formed, it is desirable to coat the fibers with a material that does not interact with the matrix at elevated temperatures. Noble metals such as platinum and iridium and certain oxides such as $ZrO_2$ and $SnO_2$ in addition to having high melting points generally do not bond to structural matrix materials such as alumina at anticipated use temperatures of up to about 1500° C.

As discussed above, CVD is an extremely slow and expensive method of applying coatings while other prior art methods have resulted in poorly adhering, uneven coatings.

EXAMPLE 1

To a mixture of a finely divided high surface area refractory oxide and a guanidine soap, is added enough organic solvent, usually ethanol to form a slurry. Other suitable solvents include methanol, propanol and isopropanol but ethanol is preferred. To give good flow properties the general weight ratio of oxide to soap is usually in the range 1:1 to 1:10 depending on the oxide, fatty acid used to make the guanidine and the type of substrate to be coated.

Good results for the coating of alumina (Saphikon) fibers (0.005" diameter) with a dense zirconia ($ZrO_2$) coating was achieved using guanidine 2-ethyl-hexanoate as a melt. The salt is made by neutralizing a solution of 2-ethyl-hexanoic acid in ethanol with an ethanol solution of guanidine hydroxide according to the formula

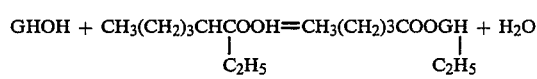

Enough GHOH should be added to just produce a basic phenolphthalein end point. The alcohol is carefully evaporated leaving the solid guanidine soap. The soap is dried at about 110° C. overnight.

To prepare the $ZrO_2$ coating medium for saphikon fibers the following formulation was placed in a small ball milling jar.

| | |
|---|---|
| $ZrO_2$ (high surface area) | 5 gm. |
| G-ethyl-hexanoate | 20 gm. |
| Ethanol | 25 ml. |

The mixture was ball milled for about twenty four hours using zirconia balls. The milled zirconia slurry was heated on a hot plate with stirring to evaporate the ethanol. The remaining solid $ZrO_2$ soap mixture was placed on a platinum boat and melted on a hot plate. Prior to coating, the fiber was cleaned by treating with 2% HF at 80° C. for two hours. The fiber was passed through the melt (T=~150°) which adhered well to the fiber. The coated fibers were heated at 150° C. for at least one hour then each fiber was slowly passed through the flame of a Meker-type burner (t=1150° C.). The process was repeated until the desired thickness was obtained. Five cycles produced a thickness of several microns of densified $ZrO_2$. Finally, to further densify the $ZrO_2$ coating, the coated fiber was slowly heated to 1450° C., left there for six hours, then slowly cooled to room temperature. The result was a dense, adherent $ZrO_2$ coating on the alumina fiber, the coating being free of undesirable contaminants.

EXAMPLE 2

The following specific example will illustrate one of the numerous coating techniques that may be used. This example involves the coating of single crystal alumina (Saphikon) fibers (0.005" diameter) with platinum. Before coating, the fibers were cleaned by exposing them to hot (about 90° C.), 2% aqueous HF for about two hours. The treated fibers were then washed with water and dried at 110° C. overnight.

To make up the coating mixture, 10 grams of hexachloroplatinic acid, $H_2PtCl_6.6H_2O$ and 10 grams of guanidine 2-ethyl-hexanoate were added to 25 ml of ethanol. Enough alcoholic guanidine hydroxide was added to neutralize the hexachloroplatinic acid.

$$H_2PtCl_6 + 2GHOH = (GH)_2PtCl_6 + H_2O$$

The ethanol was evaporated by heating with stirring the solution on a hot plate until a brown solid residue remained.

The brown solid containing the vehicle and platinum precursor was put into a narrow Pt boat and melted on a hot plate. The saphikon fiber was slowly drawn through the melt where by it became coated with an adherent, even coating of the solidified material. To remove some of volatiles, the coated fiber was heated at 150° C. for at least an hour, then slowly passed through a flame of a Meker type burner (about 1100° C.). The process was repeated until the desired coating thickness was obtained. Five cycles produced an even coating of Pt of about 3 microns thick. The invention is not concerned with novel heat treatment techniques. The processing methods are presented simply to illustrate the use of guanidine soaps for coating substrates. The use of soaps of other strong organic bases namely those of the quarterery ammonium hydroxides have been considered, but only the simplest, tetra-methyl-ammonium-hydroxide $(CH_3)_4NOH$ has been given serious attention. The next in the series, tetra-ethyl-ammonium-hydroxide, $(C_2H_5)_4NOH$, because of its high equivalent requires a relatively high weight of base to make the soap; thus making these soaps more costly. The strong basicity and its relative simple one carbon atom structure makes guanidine hydroxide an ideal base for the synthesis of guanidine soaps.

ALTERNATE EMBODIMENTS

An alternate embodiment of the present invention is preferable for substrates which are relatively flat or have relatively slight curvature. This enfacement places a Guanidine slat soap in an organic solvent forming a solution. A powered ceramic, powdered metal, powdered metal oxide, or insoluble precursor is added to the solution to form a slurry for coating a substrate. A soluble precursor can also be added to the solution forming a solution for coating a substrate. Both the slurry and solution can be used to coat substrates selected from the group consisting of metals, ceramics, metal nitrides, metal oxides, metal carbides, and carbon.

While a preferred embodiment and alternate embodiments of the invention have been disclosed and described, it will be appreciated that various modifications may be made to the invention without departing from its spirit and scope as set forth in the claims appended hereto.

What is claimed is:

1. A method for coating an aluminum oxide fiber with platinum comprising the steps of:
    dissolving guanidine 2-ethyl-hexanoate in an organic solvent to form a solution, said guanidine 2-ethyl-hexanoate serving as a vehicle and binder;
    adding guanidine chloroplatinate to said solution;
    drawing said fiber through said solution thereby forming a coated fiber; and
    heating said coated fiber to drive off substantially all organic components and to bond the platinum to said fiber.

2. A method as claimed in claim 1 wherein said coated fiber is cooled in ambient air.

3. A method as claimed in claim 1 wherein said coated fiber is heated to about 1150° C.

4. A method as claimed in claim 1 wherein said organic solvent is ethanol.

5. A method as claimed in claim 1 wherein said aluminum oxide fiber has a diameter of about 0.005".

* * * * *